United States Patent [19]

Light

[11] Patent Number: 4,633,988
[45] Date of Patent: Jan. 6, 1987

[54] FLUID COUPLING DEVICE WITH IMPROVED MODULATION CAPABILITY

[75] Inventor: Gerard M. Light, Marshall, Mich.
[73] Assignee: Eaton Corporation, Cleveland, Ohio
[21] Appl. No.: 745,732
[22] Filed: Jun. 17, 1985

Related U.S. Application Data

[63] Continuation-in-part of Ser. No. 433,937, Oct. 12, 1982, abandoned.

[51] Int. Cl.$^4$ .................. F16D 35/00; F16D 43/25
[52] U.S. Cl. .................................. 192/58 B; 192/82 T
[58] Field of Search .......................... 192/58 B, 82 T

[56] References Cited

U.S. PATENT DOCUMENTS

| | | | |
|---|---|---|---|
| 3,055,473 | 9/1962 | Oldberg et al. | 192/58 B |
| 3,227,254 | 1/1966 | Sutaruk | 192/58 B |
| 3,587,800 | 6/1971 | Crawford | 192/58 B |
| 3,587,801 | 6/1971 | Riner | 192/58 B |
| 3,613,847 | 10/1971 | Masai | 192/58 B |
| 3,690,428 | 9/1972 | La Flame | 192/58 B |
| 3,921,772 | 11/1975 | Hayashi et al. | 192/58 B |
| 4,116,317 | 9/1978 | Streeter | 192/58 B |
| 4,132,299 | 1/1979 | Rohrer et al. | 192/58 B |
| 4,246,995 | 1/1981 | Gee | 192/58 B |
| 4,405,039 | 9/1983 | Hauser | 192/58 B |
| 4,423,803 | 1/1984 | Malloy | 192/3.29 |
| 4,469,209 | 9/1984 | Hayashi et al. | 192/58 B |

FOREIGN PATENT DOCUMENTS 2364234  7/1975  Fed. Rep. of Germany .... 192/58 B

OTHER PUBLICATIONS

"Heavy Duty Engine Cooling Systems", Society of Automotive Engineers, Sep., 1982.

*Primary Examiner*—Rodney H. Bonck
*Attorney, Agent, or Firm*—C. H. Grace; L. J. Kasper

[57] ABSTRACT

An improved fluid coupling device is disclosed of the type including modulating valving. The coupling device includes an input coupling member (11) and an output coupling member (13) which cooperate to define a plurality of annular lands (57 and 59). The input member defines a rearward surface (61) and the output member defines an adjacent surface (63), thus forming a bottom end clearance within the coupling. The input coupling member further defines an annular transverse surface (71) and a cylindrical surface (73) which cooperate to define an annular recess (75). As the air temperature is increasing, and the operating chamber (33) is being filled with fluid, the annular recess (75) prevents the bottom end clearance from filling with viscous fluid in a way which results in an undesirably rapid rate of increase of the speed of the output coupling member (13). As another feature of the present invention, the lands (57) defined by the input member include a plurality of radially outer lands (57a, 57b, and 57c) having an axial length less than the nominal axial length L of the remaining lands (57), to further reduce the rate of increase of viscous shear torque transmitted to the output coupling member.

6 Claims, 3 Drawing Figures

FLUID COUPLING DEVICE WITH IMPROVED MODULATION CAPABILITY

CROSS-REFERENCE TO RELATED APPLICATION

This application is a continuation-in-part of U.S. application Ser. No. 433,937, filed Oct. 12, 1982, now abandoned.

BACKGROUND OF THE DISCLOSURE

The present invention relates to fluid coupling devices, and more particularly, to fluid coupling devices of the type including modulating valving.

Although the present invention may be used advantageously in fluid coupling devices having many different configurations and applications, it is especially advantageous in a coupling device of the type used to drive a radiator cooling fan of an internal combustion engine, and will be described in connection therewith.

Fluid coupling devices of the viscous shear type have been popular for many years for driving engine cooling fans, primarily because their use results in a substantial saving of engine horsepower, when compared to a conventional shaft driven fan. The horsepower savings results from the fact that the viscous coupling operates in the engaged, full speed condition only when cooling is needed, and operates in a disengaged, relatively lower speed condition when little or no cooling is required.

In an effort to effect even greater savings of engine horsepower, those working in the art developed "modulating valving" for fluid couplings of the type to which the invention relates. See for example U.S. Pat. No. 3,227,254, assigned to the assignee of the present invention. Briefly stated, modulating valving has the effect of moving the fluid inlet opening radially outward as the temperature increases, to progressively increase the volume of fluid in the operating chamber of the device, as the ambient air temperature increases over a predetermined range.

However, in applying modulating valving to various sizes and configurations of fluid coupling devices, it has been found that frequently the use of modulating valving alone is not sufficient to achieve the desired fan speed vs. temperature relationship. Instead, fan speed (fluid coupling output speed) rises more rigidly with increasing temperature than is desirable.

SUMMARY OF THE INVENTION

Accordingly, it is an object of the present invention to provide a fluid coupling device of the type including modulating valving, wherein the modulation characteristics can be attained in various sizes and configurations of coupling devices.

It is another object of the present invention to provide a fluid coupling device which achieves the above-stated object by means of a modification of some portion of the fluid coupling device, other than the modulating valving itself.

The above and other objects of the present invention are accomplished by the provision of an improved fluid coupling device of the type including a first rotatable coupling assembly defining a fluid chamber, valve means disposed to separate the fluid chamber into an operating chamber and a reservoir chamber, and a second rotatable coupling member disposed in the operating chamber. The valve means is operable to control the flow of fluid between the reservoir chamber and the operating chamber and is of the type which is configured to provide modulating operation. The second coupling member defines a generally cylindrical outer surface including forward and rearward transverse surfaces. The forward surface and the adjacent wall surface of the first coupling assembly cooperate to define a viscous shear area, and the rearward surface and the adjacent wall surface of the first coupling assembly define a clearance.

The invention is characterized by the outer surface and the rearward surface cooperating to define an annular recess, the annular recess being defined by an annular transverse surface portion, generally parallel to the rearward surface, and by a cylindrical surface portion, generally concentric with the cylindrical outer surface. The annular recess has an axial extent less than about one-third of the axial extent of the cylindrical outer surface of the second coupling member. The annular recess provides a localized region having a substantially lower viscous shear rate than the shear rate in the clearance, to thereby reduce the rate of increase of viscous shear torque transmitted from the second coupling member to the first coupling assembly as fluid is communicated to the operating chamber.

In accordance with another aspect of the present invention, the forward transverse surface and the adjacent wall surface of the first coupling assembly each define a plurality of annular lands and grooves. Each set of lands has a nominal axial length, and at least one of the sets of lands includes a plurality of radially outer lands having an axial length less than the nominal axial length, to further reduce the rate of increase of viscous shear torque transmitted from the second coupling member to the first coupling assembly as fluid is communicated to the operating chamber.

DESCRIPTION OF THE PREFERRED EMBODIMENT

Figure 1:
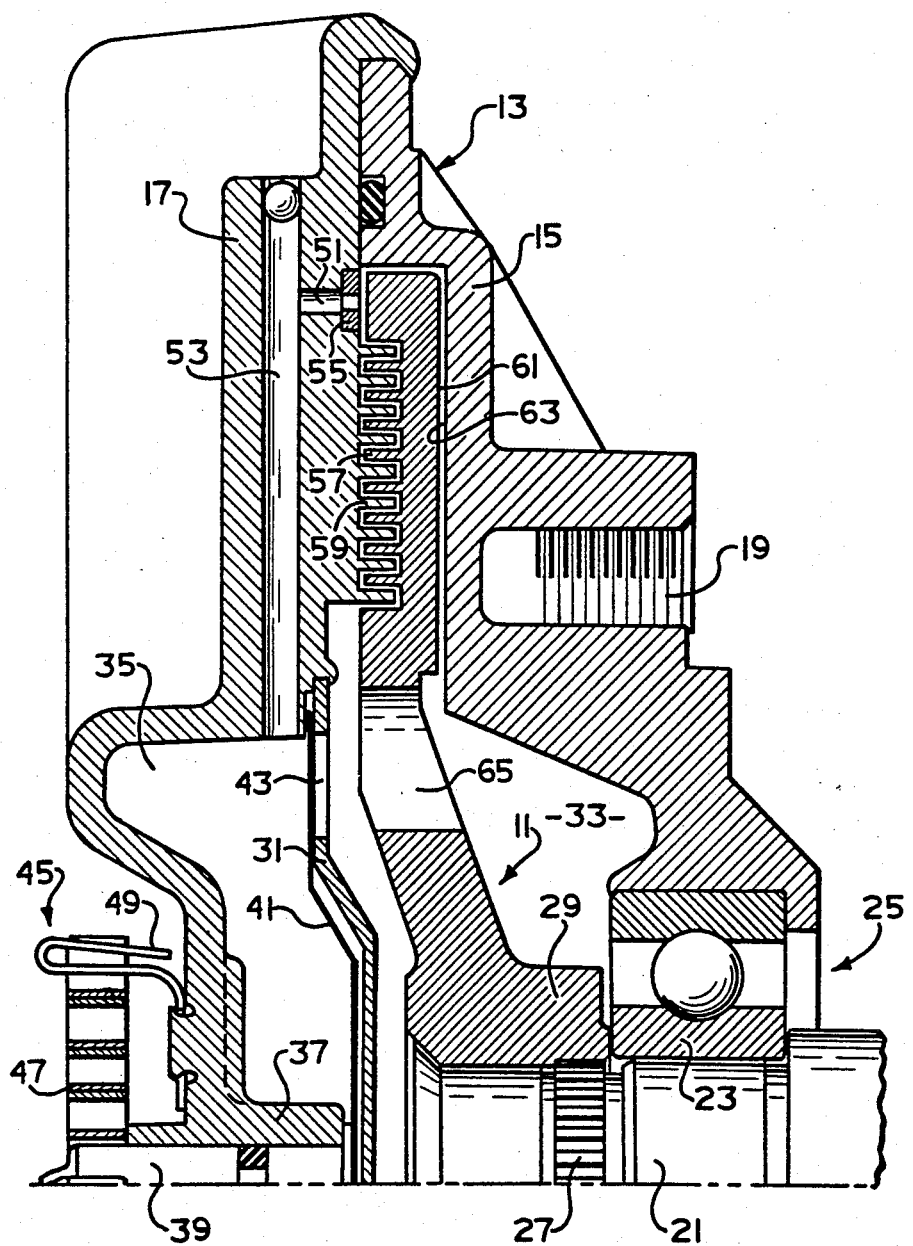
FIG. 1 is an axial cross section illustrating one-half of a typical fluid coupling device of the type which can utilize the present invention.

Referring now to the drawings, which are not intended to limit the invention, FIG. 1 illustrates one preferred form of a fluid coupling device of the type in which the present invention may be utilized. It should be understood that the structure of the invention is shown only in the enlarged view of FIG. 2, for ease of illustration. The fluid coupling device includes an input coupling member, generally designated 11, and an output coupling assembly, generally designated 13. The output coupling assembly 13 includes a cast metal housing member 15 and a cast metal cover member 17, the members 15 and 17 being secured together by a plurality of bolts (not shown). The fluid coupling device is adapted to be driven by a liquid cooled engine and, in turn, drives an automotive engine accessory, such as a radiator cooling fan. The fan (not shown) may be bolted to the housing member 15 by means of a plurality of threaded bores 19 formed in the member 15. It will be understood, however, that the use of the present invention is not limited to any particular fluid coupling device configuration or application, except as specifically noted hereinafter.

The fluid coupling device includes an input shaft 21 on which the input coupling member 11 is mounted. The input shaft 21 is rotatably driven, typically by means of a flange (not shown) which may be bolted to the flange of an engine water pump. The input shaft 21 functions as a support for the inner race 23 of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft 21 causes rotation of the input coupling member 11.

The housing member 15 and the cover member 17 cooperate to define a fluid chamber which is separated, by means of a circular valve plate 31 into a fluid operating chamber 33 and a fluid reservoir chamber 35. Thus, it may be seen that the input coupling member 11 is disposed wholly within the fluid operating chamber 33.

The cover member 17 defines a generally cylindrical shaft support portion 37, and rotatably disposed within the portion 37 is a valve shaft 39 extending outwardly (to the left in FIG. 1) through the cover member 17. Attached to the inner end (right end in FIG. 1) of the valve shaft 39 is a valve arm 41, the generally construction of which forms no part of the present invention, but which may be better understood by reference to U.S. Pat. No. 3,055,473. Movement of the valve arm 41 controls the flow of fluid from the reservoir chamber 35 to the operating chamber 33, through a fill opening 43 formed in the valve plate 31.

Operatively associated with the outer end of the valve shaft 39 is a bimetal element, generally designated 45, which, in the subject embodiment, is formed in the shape of a helical coil 47. The bimetal element 45 includes a clip assembly 49 which maintains the outer end of the coil 47 fixed relative to the cover member 17. The manner in which the bimetal element 45 operates to control the movement of the valve arm 41 is well known in the art, is not an essential feature of the present invention, and will not be described further.

The cover member 17 defines an axial passage 51 in communication with the fluid operating chamber 33, and a radial passage 53 which provides fluid communication from the axial passage 51 to the fluid reservoir chamber 35. Disposed adjacent the axial passage 51 is a pumping element (wiper) 55, operable to engage the relatively rotating fluid in the operating chamber 33, to generate a localized region of relatively higher fluid pressure, and continually pump a small quantity of fluid back into the reservoir chamber 35, through the passages 51 and 53, as is well known in the art.

In the subject embodiment, the input coupling member 11 includes a forward surface which defines a plurality of annular lands 57. The adjacent surface of the housing member 17 forms a plurality of annular lands 59. The annular lands 57 and 59 are interdigitated to define a serpentine-shaped forward shear space therebetween. The input coupling member 11 includes a rearward surface 61 which cooperates with an adjacent surface 63 of the housing member 15 to define therebetween a clearance (typically referred to in the art as the "bottom end" clearance).

Referring still primarily to FIG. 1, a brief description will be given of the fluid flow path during filling of the conventional form of fluid coupling device of the type shown in FIG. 1. When the valve arm 41 moves to begin uncovering the fill opening 43, a fluid flows from the reservoir chamber 35 into the operating chamber 33. The fluid entering the operating chamber 33 flows outwardly between the lands 57 and 59 to the radially outermost region surrounding the input member 11. The fluid in this region impacts the pumping element 55, thus creating a localized region of relatively higher pressure. A portion of this high pressure fluid flows through the passages 51 and 53 into the reservoir chamber 35, as described previously, and the remainder of the fluid is forced out around the input member 11 into the bottom end clearance.

As was mentioned in the background of the specification, the present invention is intended to be used with a fluid coupling device of the type including "modulating valving". Reference was made to U.S. Pat. No. 3,227,254, which is incorporating herein by reference for its teaching of a typical prior art modulating valve arrangement. Thus, although it is a feature of the present invention that the fluid coupling device be of the type including modulating valving, the particular configuration and mode of operation of the modulating valving is not an essential feature of the invention, and will not be described further herein.

In attempting to apply modulating valving to several fluid coupling devices of the general design shown in FIG. 1, it was observed that the modulating characteristics were generally unsatisfactory, as well be described in greater detail subsequently in connection with the graph of FIG. 3. As is well known to those skilled in the art, previous attempts to obtain or modify modulation characteristics of a fluid coupling device have been centered around the valving, and controlling the rate at which fluid flows from the reservoir into the operating chamber.

Figure 2:
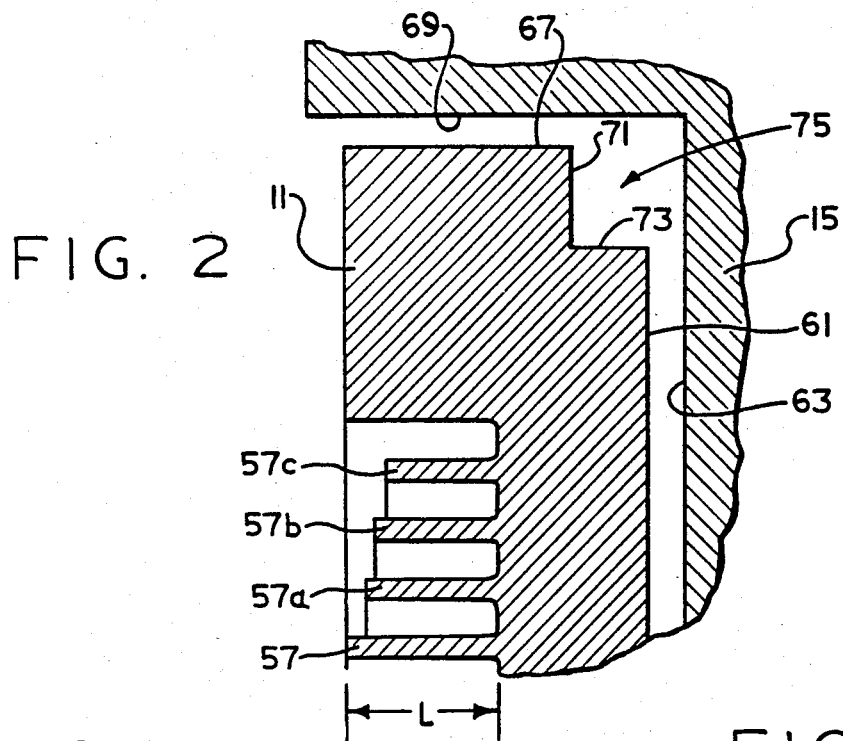
FIG. 2 is an enlarged, fragmentary view, similar to FIG. 1, illustrating one embodiment of the present invention.

It is one important aspect of the present invention to take a modulating type fluid coupling device and attempt to improve the modulation characteristics by modifying some portion of the fluid coupling device, other than the modulating valving. As is shown in FIG. 2, the input coupling member 11 defines a generally cylindrical outer surface 67, which is spaced apart from an internal cylindrical surface 69 defined by the housing member 15. This space is normally referred to as the "OD clearance".

Referring still to FIG. 2, the input coupling member of the present invention includes an annular transverse surface 71, which is oriented generally parallel to the rearward surface 61. In addition, the input coupling member 11 defines a cylindrical surface portion 73, which is generally concentric with the cylindrical outer surface 67. The surfaces 71 and 73 cooperate with the cylindrical surface 69 and with the adjacent surface 63 to define an annular recess 75. The use of various shapes and sizes of recesses and cutout portions from the input coupling member is known in the art. For example, U.S. Pat. No. 4,116,317, assigned to the assignee of the present invention, shows a standard "rear land and groove" fluid coupling device in which the input coupling member defines a frusto-conical surface portion to provide a coupling having lower disengaged output speed and reduced disengagement time during cold start-up. However, it is believed that, prior to the present invention, it was unknown to utilize an input coupling member having some sort of modified configuration, in order to improve the modulation characteristics of the coupling.

Figure 3:
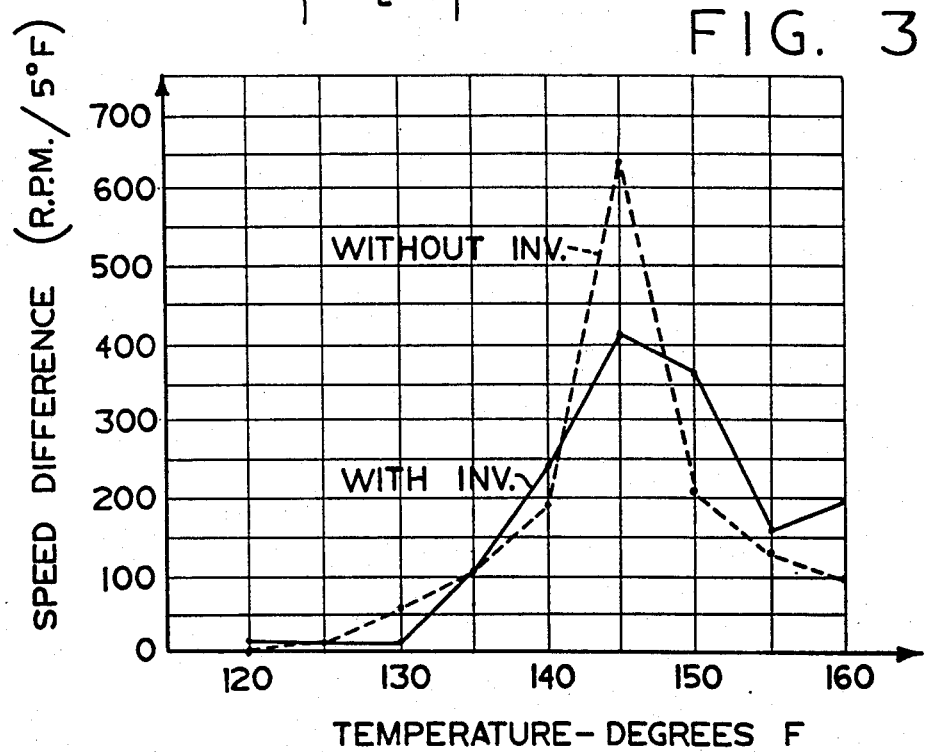
FIG. 3 is a graph of fan output speed difference (rpm/5 defrees F.) versus ambient air temperature (degrees F.) comparing the fan drive of FIG. 1 with and without the present invention.

Reference will now be made to FIG. 3 which is a graph of fan output speed difference (rpm/5 degrees F.) as a function of ambient air temperature (degrees F). In other words, FIG. 3 is a graph of the rate of increase of output speed for each five degree increase in temperature. For example, without the present invention (dashed line), the speed difference at 130 degrees is shown as 60 rpm, i.e., as the temperature increases from 125 degrees to 130 degrees, output speed increases 60 rpm. As one more example, with the invention (solid line), at 155 degrees the speed difference is 160 rpm, i.e. as the temperature increases from 150 to 155 degrees, the input speed increases 160 rpm.

It should be noted that the fluid coupling device without the invention showed an increase of 640 rpm as the temperature increased from 140 degrees to 145 degrees, an average increase of about 128 rpm per degree. As is well known to those skilled in the art, such a steep increase in output speed can result in a condition known as "cycling", wherein fan speed increases so rapidly, and so much cooling occurs, that the ambient air temperature drops down, for example, to 130 degrees and the coupling "disengages". Then, because the coupling is disengaged, ambient air temperature increases, causing the coupling to engage, and the cycle continues to repeat itself, with the coupling alternating between the fully engaged and fully disengaged conditions. Because the coupling and fan generate substantially more noise in the engaged condition than in the disengaged condition, such cycling between the two conditions results in a noise condition which is more objectionable than if the coupling remained at a fairly constant speed. In addition, the coupling consumes a greater amount of engine horsepower when it is cycling than when it is operating at a fairly constant speed.

Referring now to the curve for the same fan drive, but with the present invention included, it may be seen the output speed difference is about 410 degrees as the temperature increases from 140 degrees to 145 degrees. Thus, with the invention, the most rapid increase in fan speed is about 82 rpm per degree, vs. an increase of 128 rpm per degree with out the invention, substantially reducing the chances of cycling occurring.

Referring again to FIG. 2, the mode of operation of the present invention is not well understood. However, it has been hypothesized that the annular recess 75 provides a localized region having a substantially lower viscous shear rate than the shear rate in the clearance defined by the surfaces 61 and 63. As is well known to those skilled in the art, shear rate of viscous fluid is inversely proportional to the film thickness, and therefore, because the axial thickness defined by the transverse surface 71 and adjacent surface 63 is approximately two to three times the thickness of the bottom end clearance, the shear rate in the annular recess 75 will be about one-third to one-half the shear rate in the bottom end clearance.

It is believed that without the present invention, fluid flows to the right in FIG. 2 through the OD clearance, and then flows radially inwardly through the bottom end clearance, such that the bottom end clearance becomes substantially filled with viscous fluid. However, because of the substantial difference in speed between the input member 11 and the output member 13, the fluid does not form a continuous film between surfaces 61 and 63 immediately, but instead, the fluid is being constantly thrown off the input member 11 by the higher centrifugal force of the input member 11. As the speed of the output member 13 gradually increases, a point is reached at which the difference between the speed of the input member 11 and the speed of the output member 13 is reduced sufficiently that the fluid begins to attached to the surface 61. At this point, the output speed of the output member 13 increases suddenly and rapidly, causing an increase in the centrifugal force acting on the fluid attached to the surface 63. This results in all of the fluid in the bottom end clearance becoming attached (i.e., forming a continuous fluid film) which, in turn, results in a large increase in fan speed as the fluid in the operating chamber 33 becomes more evenly distributed, both forward and rearward of the input member 11. With the fan drive of FIG. 1, and without the invention, it is believed that this point at which attachment began to occur was reached as the temperature approached 140 degrees.

By utilizing the present invention, it has been hypothesized that because of the lower shear rate within the annular recess 75, the fluid fills the recess 75 and attaches to the surfaces 71 and the adjacent portion of surface 63, as the modulating valving introduces fluid into the operating chamber 33. With the fluid attached in the recess 75, it is further hypothesized that, as additional fluid is gradually introduced into the operating chamber 33, the attachment of fluid to the surface 61 gradually spreads, or extends, further inward radially. This results in more even filling of the shear space and bottom end clearance, on the forward and rearward sides of the input member 11 respectively, giving a more gradual rate of torque increase, and a resulting more gradual rate of fan speed increase. It has been found that the configuration of the recess 75 which is illustrated in FIG. 2 is preferred, partly because it is believed that fluid in the recess 75 attaches to the annular transverse surface 71 to provide more fully the desired result than if the recess 75 had some other configuration. It is also preferable that the recess 75 be sized such that it does not substantially reduce the axial extent of the cylindrical outer surface 67. In this regard, it has been found desirable that the axial extent of the recess 75 be less than about one-third of the axial extent of the outer surface 67.

In the course of the development of the present invention, it has been found that, when the fluid coupling is used to drive some relatively lighter (lower torque) fans, even the use of the annular recess 75 is not able to reduce the rate of increase of torque transmitted from the input member 11 to the output member 13 to obtain the desired modulation characteristic. For such applications of the fluid coupling, it is another feature of the present invention to modify the radially outermost lands and grooves to thereby reduce the torque transmitting capability thereof. Referring still to FIG. 2, in conjunction with FIG. 1, it may be seen that most of the lands 57 defined by the input member 11 have a certain, nominal axial length L. In accordance with the invention, the input member 11 includes a land 57a which has an axial length which is somewhat less than the nominal axial length L of the adjacent land 57. Similarly, radially outwardly is a land 57b having less axial length than the land 57a, and finally, further radially outward is a land 57c having less axial length than the land 57b. It is not an essential feature that the lands 57a, 57b, and 57c each be different length, however, the particular arrangement has been provided to compensate for the fact that a given shear area transmits a greater amount of torque as it is further from the rotational axis of the coupling.

The invention has been described in detail sufficient to enable one skilled in the art to practice the invention. It is believed that upon a reading and understanding of the specification, various alterations and modifications of the invention will become apparent to those skilled in the art. It is intended that all such alterations and modifications will be included as part of the invention, insofar as they come within the scope of the appended claims.

I claim:

1. A fluid coupling device of the type including a first rotatable coupling assembly defining a fluid chamber therein, valve means associated with said first rotatable coupling assembly and disposed to separate said fluid chamber into a fluid operating chamber and a fluid reservoir chamber, a second rotatable coupling member disposed in said fluid operating chamber and being rotatable realtive to said first coupling assembly, said valve means being operable to control the flow of fluid between said reservoir chamber and said operating chamber, and including control means associated with said valve means to effect operation thereof in response to variations in a predetermined temperature condition, said valve means being of the type which is configured to provide modulating operation of the fluid coupling device, said second coupling member defining a generally cylindrical outer surface and including forward and rearward transverse surfaces, said forward surface and the adjacent wall surface of said first coupling assembly cooperating to define a viscous shear area, and a first recess in which is disposed a pumping element operable to pump fluid from said fluid operating chamber to said fluid reservoir chamber, said rearward surface and the adjacent wall surface of said first coupling assembly comprising a pair of generally parallel surfaces defining a clearance, characterized by: said outer surface and said rearward surface cooperating to define a second annular recess, said second annular recess being defined by an annular transverse surface portion, generally parallel to said rearward surface, and by a cylindrical surface portion, generally concentric with said cylindrical outer surface, said second annular recess having an axial extent less than about one-third of the axial extent of said cylindrical outer surface of said second coupling member, said second annular recess providing a localized region having a substantially lower viscous shear rate than the shear rate in said clearance, to thereby reduce the rate of increase of viscous shear torque transmitted from said second coupling member to said first coupling assembly as fluid as communicated to said fluid operating chamber.

2. The fluid coupling device as claimed in claim 1 wherein said valve means includes a plate-like member defining a fluid inlet disposed to permit flow of fluid from said reservoir chamber into said operating chamber, and a movable valve member operably associated with said control means and with said fluid inlet to control the flow of fluid through said inlet in response to variations in said temperature condition.

3. The fluid coupling device as claimed in claim 1 wherein said annular transverse surface portion is spaced from said adjacent wall surface of said first coupling assembly an axial distance equal to at least about twice the axial dimension of said clearance.

4. A fluid coupling device of the type including a first rotatable coupling assembly defining a fluid chamber therein, valve means associated with said first rotatable coupling assembly and disposed to separate said fluid chamber into a fluid operating chamber and a fluid reservoir chamber, a second rotatable coupling member disposed in said first operating chamber and being rotatable relative to said first coupling assembly, said valve means being operable to control the flow of fluid between said reservoir chamber and said operating chamber, and including control means associated with said valve means to effect operation thereof in response to variations in a predetermined temperature condition, said valve means being of the type which is configured to provide modulating operation of the fluid coupling device, said second coupling member defining a generally cylindrical outer surface and including forward and rearward transverse surfaces, said forward surface and the adjacent wall surface of said first coupling assembly cooperating to define a viscous shear area, said rearward surface and the adjacent wall surface of said first coupling assembly comprising a pair of generally parallel surfaces defining a clearance, characterized by:

said forward transverse surface and the adjacent wall surface of said first coupling assembly each defining a pluraity of annular lands and grooves, each set of lands having a nominal axial length, at least one of said sets of lands including a plurality of radially outer lands having an axial length less than said nominal axial length, to thereby reduce the rate of increase of viscous shear torque transmitted from said second coupling member to said first coupling assembly as fluid is communicated to said fluid operating chamber.

5. The fluid coupling device as claimed in claim 4 wherein said plurality of said outer lands having an axial length less than nominal comprises said lands defined by said second coupling member.

6. The fluid coupling device as claimed in claim 4 wherein, among said plurality of radially outer lands, each land has less axial length than the adjacent land in the radially inward direction.

* * * * *